United States Patent
Ukigawa et al.

(10) Patent No.: US 6,877,024 B1
(45) Date of Patent: Apr. 5, 2005

(54) NETWORK SYSTEM AND METHOD FOR PROVIDING VOICE INFORMATION TO PARTICIPANTS IN A CHAT SESSION SET AT AN AUDIBLE LEVEL CORRESPONDING TO THE NUMBER OF PARTICIPANTS CURRENTLY LOGGED IN THE CHAT SESSION

(75) Inventors: Kazunori Ukigawa, Tokushima (JP); Hiroki Yamashita, Chiba (JP); Akira Yamada, Tokushima (JP)

(73) Assignee: Justsystem Corporation, Tokushima (JP)

( * ) Notice: Subject to any disclaimer, the term of this patent is extended or adjusted under 35 U.S.C. 154(b) by 672 days.

(21) Appl. No.: 09/666,086

(22) Filed: Sep. 21, 2000

(30) Foreign Application Priority Data

Sep. 21, 1999  (JP) .......................................... 11-267248
Aug. 3, 2000  (JP) ....................................... 2000-235087

(51) Int. Cl.$^7$ ............................................. G06F 15/16
(52) U.S. Cl. ...................... 709/203; 709/205; 709/219; 709/224; 709/246
(58) Field of Search ................................ 709/203, 204, 709/206, 217, 219, 229

(56) References Cited

U.S. PATENT DOCUMENTS

| | | | | |
|---|---|---|---|---|
| 6,144,991 A | * | 11/2000 | England | 709/205 |
| 6,154,813 A | * | 11/2000 | Martin et al. | 711/133 |
| 6,215,877 B1 | * | 4/2001 | Matsumoto | 380/277 |
| 6,219,045 B1 | * | 4/2001 | Leahy et al. | 345/757 |
| 6,219,614 B1 | * | 4/2001 | Uchigaki et al. | 701/211 |
| 6,253,236 B1 | * | 6/2001 | Troxel et al. | 709/217 |
| 6,324,399 B1 | * | 11/2001 | Salmivalli | 455/433 |
| 6,345,290 B2 | * | 2/2002 | Okada et al. | 709/204 |
| 6,430,607 B1 | * | 8/2002 | Kavner | 709/217 |

FOREIGN PATENT DOCUMENTS

| | | | | |
|---|---|---|---|---|
| DE | 19815347 A1 | * | 10/1999 | H04M/3/56 |
| JP | 55047713 A | * | 4/1980 | H03G/3/00 |
| JP | 2000-40162 A | | 2/2000 | |

* cited by examiner

*Primary Examiner*—Hosain Alam
*Assistant Examiner*—Oanh Duong
(74) *Attorney, Agent, or Firm*—McDermott Will & Emery LLP

(57) ABSTRACT

A server device having a content provider, a voice provider and an access number counter, etc. is arranged on the Internet. The content provider provides terminal devices connected to the Internet with the contents (e.g., contents of a chat) which are updated at predetermined intervals. The access number counter counts the number of terminal devices which have currently logged in to the contents provided by the content provider and have not logged out therefrom. The voice provider sets a voice level in accordance with a value counted by the access number counter, every time new contents are provided by the content provider, and provides voice data.

28 Claims, 11 Drawing Sheets

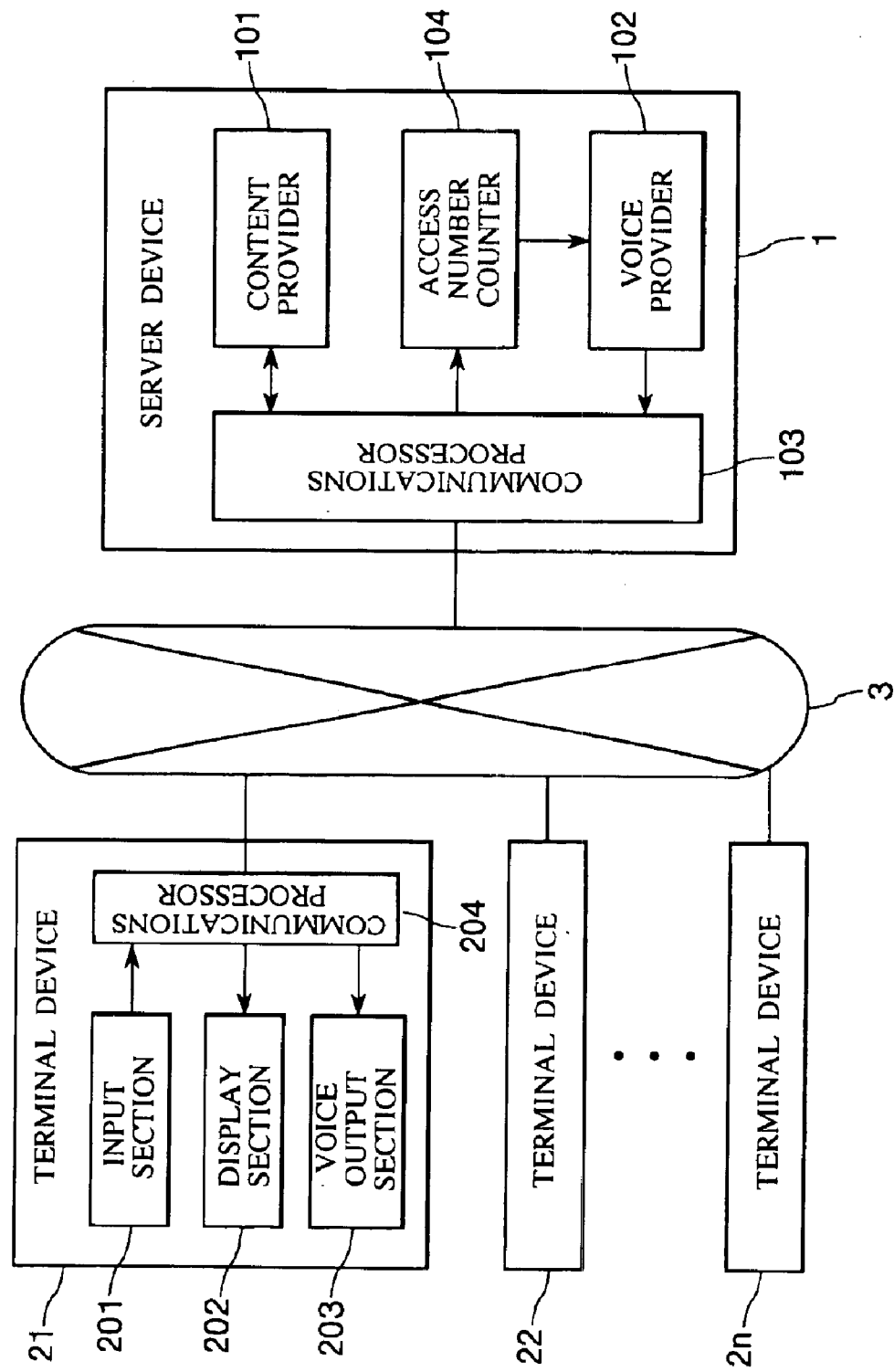

"AUDIENCE IS SO ENTHUSIASTIC ABOUT DEBATE"

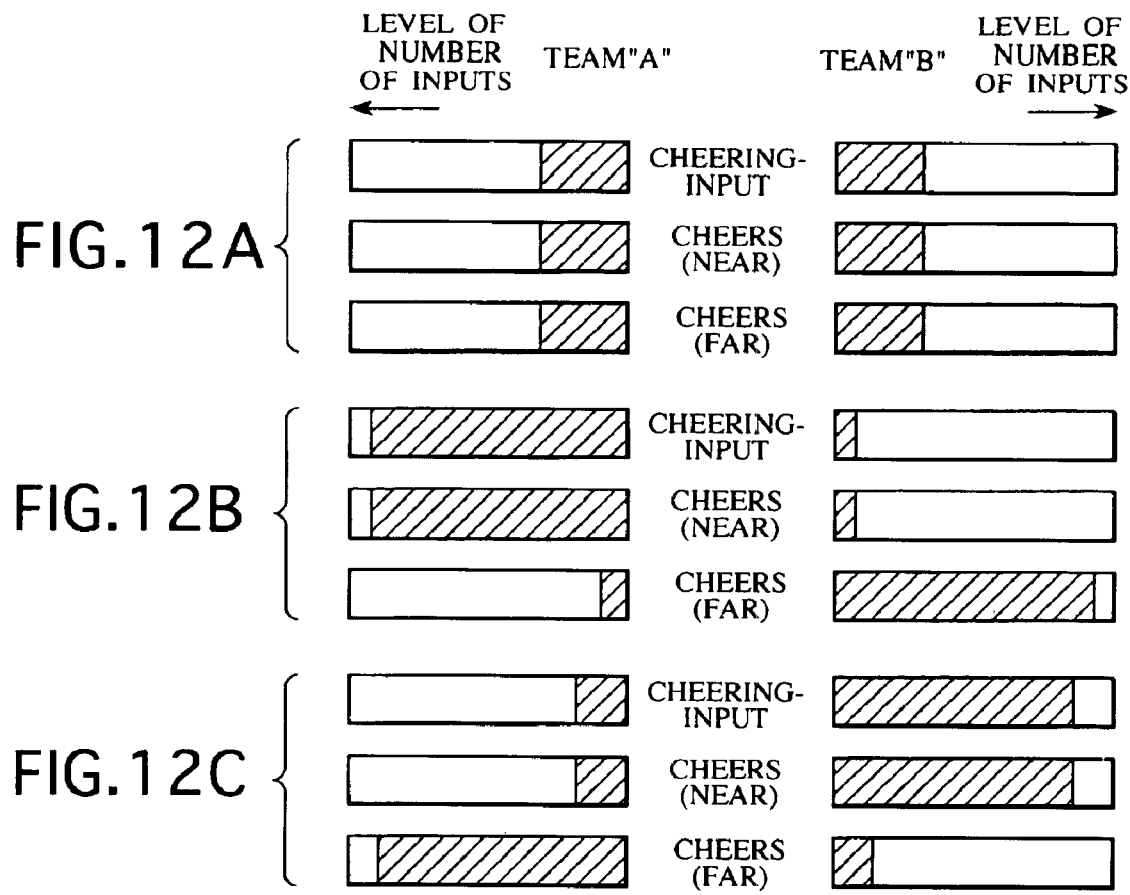
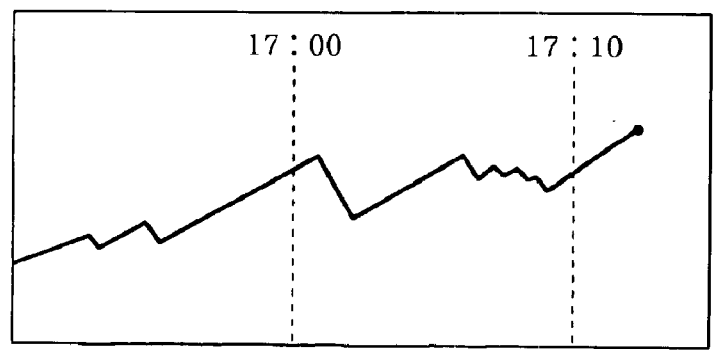

NETWORK SYSTEM AND METHOD FOR PROVIDING VOICE INFORMATION TO PARTICIPANTS IN A CHAT SESSION SET AT AN AUDIBLE LEVEL CORRESPONDING TO THE NUMBER OF PARTICIPANTS CURRENTLY LOGGED IN THE CHAT SESSION

BACKGROUND OF THE INVENTION

1. Field of the Invention

The present invention relates to a technique for providing from a server device to terminal devices with information which gives users of the terminal devices the feeling of being present at a situation of a particular WWW site in a network system.

2. Description of the Related Art

Like a Web site on the WWW (World Wide Web), those contents to be sent to terminal devices from a server device through the Internet include, for example, a chat room which requires user participation. Such contents which require user participation are updated at predetermined intervals in accordance with information sent from the terminal devices, and sent to the terminal devices every time the contents are updated. Such contents which require user participation generally include text and image data. Even the number of users accessing the contents changes, the format of the contents itself does not remarkably change.

Web sites on the WWW include those which provide voice data in addition to the contents composed of text and image data. The voice data to be provided in addition to the contents is prepared for outputting a voice corresponding to the background voice of the contents displayed on the display device of each terminal device. Regardless of the number of users accessing the contents, the same voice data is to be provided from the server device.

However, in the real-life conversation, for example, the more the number of participants or the number of speakers, the larger the noise in the conversation as a whole. Conventionally, in any chat room provided in a WWW site, even the number of participants or the number of senders sending messages increases, no change is shown in the format of the provided contents. Even in the contents with voice data, no change in a voice to be output is made. Hence, in the conventional chat rooms, only little change is made in the contents, so the matter to be considered is that the conventional chats do not give the users much the feeling of being present at the chat room as compared to the real-life conversation.

SUMMARY OF THE INVENTION

An object of the present invention is to provide: a network system capable of providing terminal devices from a server device information for giving users the feeling of being present at a situation of a network service, particularly voice data; an information server system; a method for providing information; a server device and a recording medium recording a program for realizing the server device. In order to accomplish the above object, according to the first aspect of the present invention, there is provided a network system which includes a server device and terminal devices connected to the server device through a network, wherein:

the server device includes
 input information receiving means for receiving predetermined input information which is sent from the terminal devices through the network,
 counting means for counting in accordance with the input information which the input information receiving means has received,
 information providing means for providing information corresponding to a value counted by the counting means, and
 sending means for sending the information provided by the information providing means to the terminal devices through the network; and each of the terminal device includes,
 input means for inputting the predetermined input information;
 input information sending means for sending the input information input from the input means, and controlling the input information receiving means of the server device to receive the input information,
 receiving means for receiving the information sent from the sending means of the server device through the network, and
 output means for outputting the information received by the receiving means.

In the above-described network system, depending on what and how much input information is input through the input means of the terminal devices, the contents of the information provided by the information providing means of the server device differ. The contents of the information are output from the output means of the terminal devices. That is, in the above-described network system, in accordance with the input information sent to the server device from the terminal devices, the information provided by the server device to the terminal devices can give the users of the terminal devices the feeling of being present at a situation of a network service.

In the above-described network system,
 the information providing means may include, for example, voice providing means for providing voice data corresponding to the value counted by the count means. In this case,
 the output means may include voice output means for outputting a voice corresponding to the voice data which is provided by the voice providing means and sent by the sending means and then received by the receiving means.

In the above-described network system,
 the terminal devices connected to the server device may be divided into groups. In this case,
 the count means may be one for counting for every group of the terminal devices; and
 the information providing means may provide the terminal devices with various information which differ from each group of the terminals, in accordance with a counted result for each group as counted by the count means.

In order to achieve the above object, according to the second aspect of the present invention, there is provided a network system including a server device and terminal devices connected to the server device through a network, wherein:

the server device includes a memory for storing a program, a processor for executing the program, and a first communications device for sending and receiving information to and from the terminal devices,
 the first communications device receiving predetermined input information sent from the terminal devices through the network,
 the processor counting in accordance with the input information received by the first communications device, the processor generating information corresponding to the counted value, and the server device sending the generated information to the terminal devices from the first communications device through the network;

each of the terminal devices includes a memory for storing a program, a processor for executing the program, an input device for inputting information, an output device for outputting information, and a second communications device for sending and receiving to and from the server devices, inputs the predetermined input information through the input device, sends the input information input from the input device to the second communications device from the second communications device through the network, the second communications device receiving the information from the communications device of the server device through the network, and each of the terminal deices outputting the information received by the second communications from the output device.

In order to achieve the above object, according to the third aspect of the present invention, there is provided an information server system which serves participants of a network service with information through a network, the system comprising:

accepting means for accepting predetermined information sent from the participants of the network service through the network;

count means for counting in accordance with the predetermined information which the accepting means has accepted; and information providing means for providing information corresponding to a value counted by the count means to the participants of the network service through the network.

In order to achieve the above object, according to the fourth aspect of the present invention, there is provided a method for serving information, in a network system including a server device and terminal devices connected to each other through a network, from the server device to the terminal devices, the method comprising:

an inputting step of inputting predetermined input information from the terminal devices;

an input information sending step of sending the input information input in the inputting step from the terminal devices to the server device through the network;

a counting step of counting according to the input information which is sent in the input information sending step and received by the server device;

an information providing step, as performed by the server device, providing information corresponding to a value counted in the counting step;

a sending step of sending the information provided in the information providing step to the terminal devices from the server device through the network; and an outputting step of outputting from the terminal devices the information sent in the sending step and received by the terminal device.

In order to achieve the above object, according to the fifth aspect of the present invention, there is provided a method for providing information to participants of a network service through a network, the method including providing the participants of the network service through the network with information corresponding to a value counted in accordance with predetermined information sent from the participants of the network service through the network.

In order to achieve the above object, according to the sixth aspect of the present invention, there is provided a server device which is connected to terminal devices through a network, comprising:

input information receiving means for receiving predetermined information sent from the terminal devices through the network;

counting means for counting in accordance with the input information received by the input information receiving means;

information providing means for providing information in accordance with a value counted by the counting means.

In the above-described server device, depending on what and how much input information is sent from the terminal devices, the contents of the information to be provided by the information providing means can changed. That is, the above-described server device can give the users of the terminal devices the feeling of being present at a situation of a network service with the information to be provided, in accordance with the input information from the terminal devices.

In the above-described server device, the information providing means may include, for example, voice providing means for providing voice information corresponding to the value counted by the counting means.

In this case, the the voice providing means may provide voice information having a modified voice representation (for example, a voice level, contents of a voice, high/low levels, intonation) which is output in accordance with the value counted by the counting means.

In the above server device, the predetermined input information may be information representing logging in/out of the terminal devices to/from the information provided by the information providing means. In this case, the counting means may count up when the input information represents the logging in of the terminal devices, and count down when the input information represents the logging out of the terminal devices.

In the server device, the predetermined input information may be information, which is input from the terminal devices, as regards contents of the information provided by the information providing means. In this case, the counting means may count in accordance with the input information which is received by the input information receiving means at a predetermined interval.

The predetermined input information may include various types of the contents of the information provided by the information providing means. In this case, the counting means may be means for counting for every type of the contents of the input information.

In the server device, the terminal devices connected to the server device through the network may be divided into groups. In this case, the counting means may count for every group of the terminals; and the information providing means may provide the terminal devices with various information which differ from each group of the terminals, in accordance with a counted result for each group as counted by the counting means.

The server device may further comprise user information registration means for registering information regarding users of the terminal devices which are connected to the server device through the network. In this case, the terminal devices connected to the server device through the network may be divided into groups in accordance with the information registered by the user information registration means, and the counting means may refer to the user information registration means based on the input information received by the input information receiving means, and counts for each group of the terminal devices.

In order to achieve the above object, according to the seventh aspect of the present invention, there is provided a server device which is connected to terminal devices through a network and includes a memory for storing a program, a processor for executing the program and a communications device for sending and receiving information to and from the terminal devices, wherein:

the communications device receives predetermined input information sent from the terminal devices through the network;

the processor counts in accordance with the input information received by the communications device;

the processor generates information in accordance with a value counted by the processor; and the communications device sends the generated information to the terminal devices through the network.

In above-described the server device, the information generated by the processor may include voice information corresponding to the counted value.

In the above-described server device, the predetermined input information may be information which is input, in the terminal devices, as regards contents of the information generated by the processor and sent from the communications device. In this case, the processor may count corresponding to the input information received by the communications device at a predetermined interval.

In order to achieve the above object, according to the eighth aspect of the present invention, there is provided a computer readable recording medium which records a program making a computer device which is connected to terminal devices through a network function as:

input information receiving means for receiving predetermined input information sent from the terminal devices through the network;

counting means for counting in accordance with the input information received by the input information receiving means; information providing means for providing information in accordance with a value counted by the counting means; and sending means for sending the information provided by the information providing means to the terminal devices through the network.

In order to achieve the above object, according to the ninth aspect of the present invention, there is provided a computer data signal embodied in a carrier wave and sent through a communications path, the signal making a computer device which is connected to a plurality of terminal devices through a network function as:

input information receiving means for receiving predetermined input information sent from the terminal devices through the network; counting means for counting in accordance with the input information received by the input information receiving means; and information providing means for providing information in accordance with a value counted by the counting means; and sending means for sending the information provided by the information providing means to the terminal devices through the network.

BRIEF DESCRIPTION OF THE DRAWINGS

FIG. 1 is a block diagram showing the structure of a network system which is adapted for the first embodiment of the present invention.

FIGS. 12A to 12C are diagrams each showing the relationship between an input number of cheers for teams "A" and "B" and levels of voices output from each terminal device.

FIG. 13 is a diagram showing an example of a time series graph which is displayed on a terminal device in another embodiment of the present invention.

DETAILED DESCRIPTION OF THE PREFERRED EMBODIMENTS

Embodiments of the present invention will now be described with reference to the attached drawings.

First Embodiment

In this embodiment, explanations will now be made to a system, which presents the number of users participating a chat room provided as a network service so as to give the feeling of actually speaking up in a real-life chat to the users, by way of example. FIG. 1 is a block diagram showing the structure of a network system which is adapted for this embodiment. As illustrated, this network system includes a server device 1 and a plurality of terminal devices 21 to 2n which are connected to the server device 1 through the Internet 3.

Figure 2B:
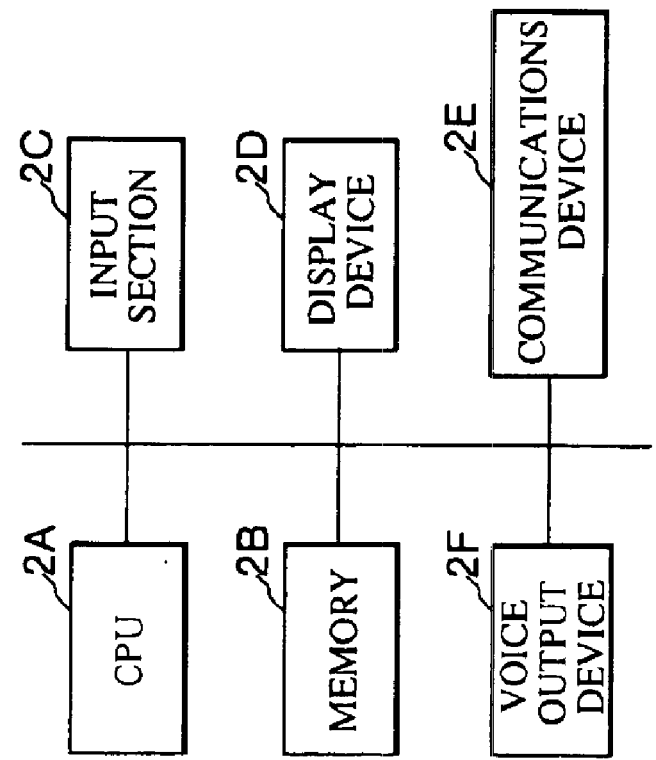
FIG. 2B is a diagram showing the structure of a terminal device shown in FIG. 1.
Figure 2A:
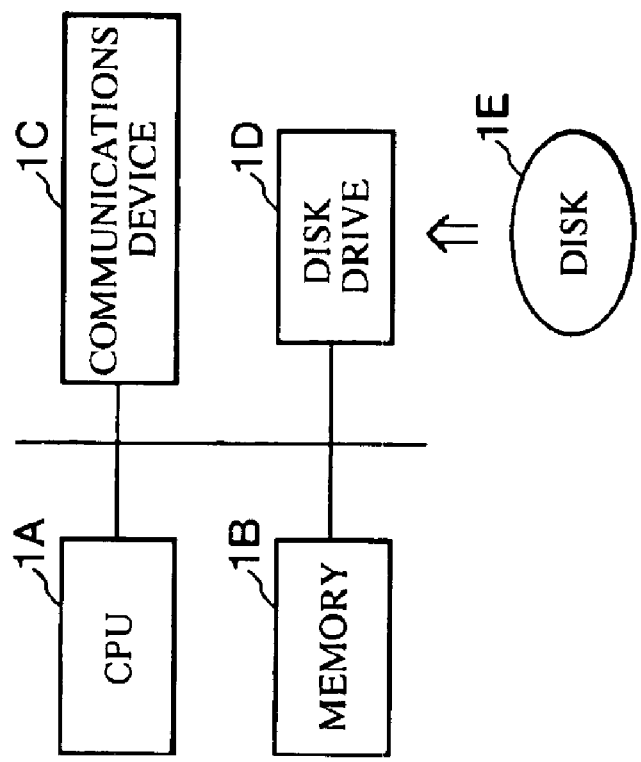
FIG. 2A is a diagram showing the structure of a server device shown in FIG. 1.

The server device 1 includes a content provider 101, a voice provider 102, a communications processor 103, and an access number counter 104. The server device 1 as the hardware for realizing each of the sections 101 to 104 includes, as illustrated in FIG. 2A, a CPU (including an internal timer) 1A, a memory 1B, a communications device 1C, and a disk drive 1D. A program for realizing the functions of each of the sections 101 to 104 is given and stored on a disk 1E, and read by the disk drive 1D and stored in the memory 1B. Otherwise, this program is embodied in a carrier wave, transmitted from another computer apparatus (not illustrated) through the Internet 3, received by the communications device 1C, and stored in the memory 1B. The CPU 1A executes the program stored in the memory 1B, thereby to realize the functions of each of the sections 11 to 16.

The content provider 101 periodically updates and provides the contents of the chat room which is provided as contents, based on any message sent from the terminal devices 21 to 2n. The voice provider 102 periodically sets a level of a voice in accordance with a value counted by the access number counter 104. The voice provider 102 provides voice data corresponding to a voice (e.g., a noise made by people) output in the terminal devices 21 to 2n.

The communications processor 103 transmits the contents provided by the content provider 101 and the voice data provided by the voice provider 102 to the terminal devices 21 to 2n through the Internet 3. The communications processor 103 receives messages which have been sent from the terminal devices 21 to 2n through the Internet 3.

The access number counter 104 counts up, when the communications processor 103 receives a message representing user login. The access number counter 104 counts down, when the communications processor 103 receives a message representing user logout. The value counted by the access number counter 104 represents the number of terminal devices 21 to 2n, which have logged in to a chat provided on the Internet as contents and have not logged out therefrom.

Each of the terminal devices 21 to 2n includes a general-purpose computer device having a processor, a memory, an input device, a display device and a communications device, and includes an input section 201, a display section 202, a voice output section 203 and a communications processor 204 (note that only the terminal device 21 is shown in the illustration). As the hardware for realizing each of the sections 201 to 204, each of the terminal devices 21 to 2n includes a CPU 2A, a memory 2B, an input device 2C, a display device 2D, a communications device 2E, and a voice output device 2F and the like. The CPU 2A executes a program stored in the memory 2B, thereby to realize functions of each of the sections 201 to 204. The browser software runs on each of the terminal devices 21 to 2n.

The input section 201 inputs an instruction of logging in to or out from a chat room provided as contents, or inputs a message which a user has in mind for the contents of the chat room. The display section 202 displays the contents provided by the content provider 101 of the server device 1 under the control of the browser software. The voice output section 203 outputs a voice corresponding to voice data provided by the voice provider 102 of the server device 1.

The communications processor 103 transmits a message input from the input section 201 to the server device 1 through the Internet 3. The communications processor 103 receives the contents and voice data sent from the server device 1 through the Internet 3.

Operations of the network system of this embodiment will now be described. Explanations will now be made to the operations in accordance with the functional block diagram of FIG. 1.

In the case where users of the terminal devices 21 to 2n intend to participate in a chat room, the browser software runs and a URL (Uniform Resource Locator) is input through the input section 201. By doing so, the contents of the first page of the chat room is received from the content provider 101 of the server device 1 via the Internet 3 and the communications processor 103, and the contents can be displayed on the display section 202.

Next, each of the users of the terminal devices 21 to 2n operates the input section 201 and clicks a predetermined button, indicating logging into a chat room, on the contents displayed on the display section 202. Having performed this, a message, indicating that each of the users intends to log in to the server device 1 from the communications processor 204 of each of the terminal devices 21 to 2n through the Internet 3, is transmitted and received by the server device 1, thereby each of the users logs in to the chat room.

Figure 3:
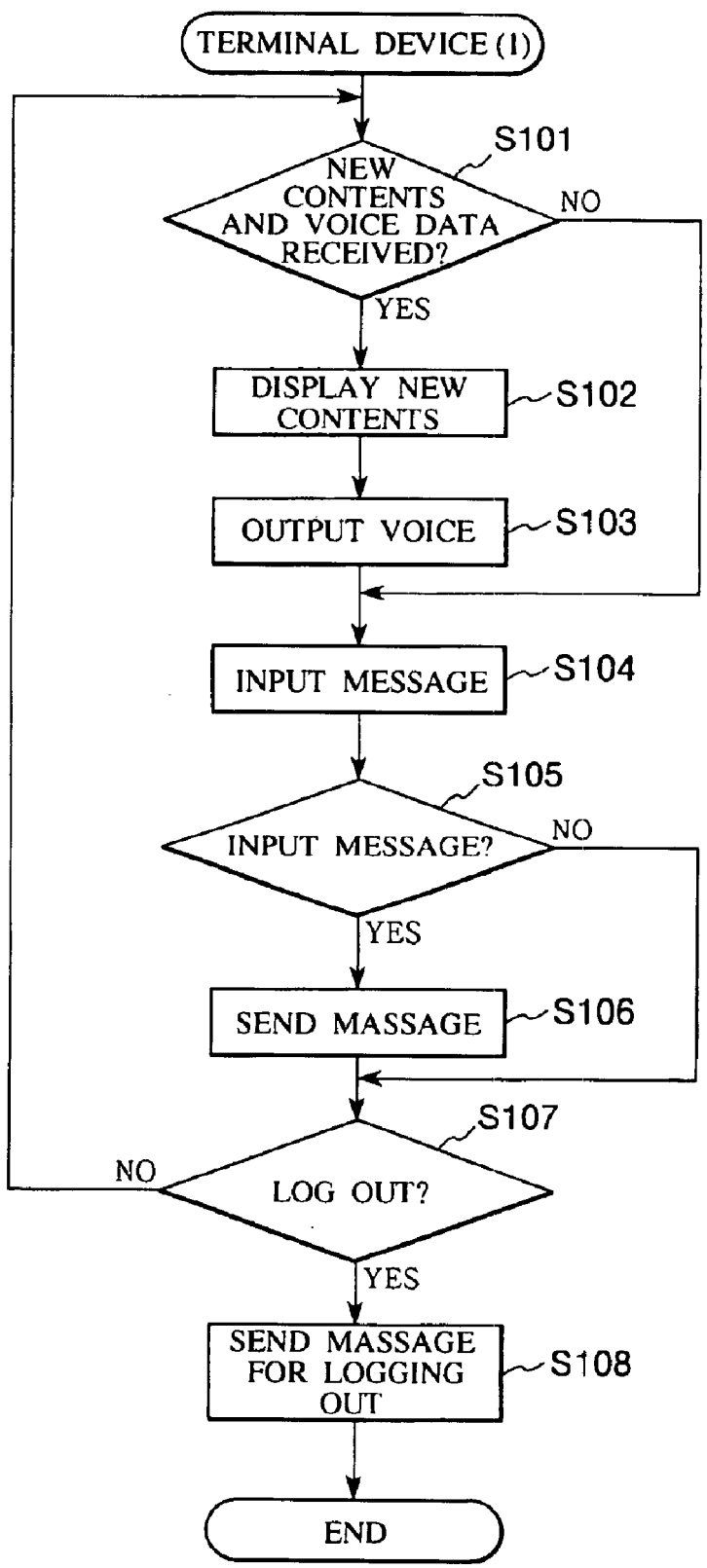
FIG. 3 is a flowchart showing a process which is carried out by the terminal device in the first embodiment of the present invention.

FIG. 3 is a flowchart showing a process which the terminal devices 21 to 2n carries out after having logged in to the chat room. The process described as one to be performed by the terminal devices 21 to 2n is a process which is substantially carried out by the CPU 2A executing the program stored in the memory 2B. The process described as one to be performed by each of the sections 201 to 204 is a process which is carried out by the CPU 2A executing the program stored in the memory 2B so as to control the corresponding hardware (the same applies below).

Each of the terminal devices 21 to 2n discriminates whether its communications processor 204 has received new contents (updated contents of a chat room) and voice data which are transmitted from the server device 1 via the Internet 3 (Step S101).

In the case where the communications processor 204 has received new contents and voice data, the display section 202 displays the new contents (Step S102), and the voice output section 203 outputs a voice corresponding to the new voice data (Step S103). Then, the flow advances to the procedure of Step S104. On the contrary, in the case where the communications processor 204 has not received any new contents and voice data, the flow advances to the procedure of Step S104. In the case where any new contents and voice data are not received, the display section 202 continuously displays the previously-received contents, and the voice output section 203 continuously outputs a voice corresponding to the previously-received voice data.

In Step S104, each user of the terminal devices 21 to 2n operates the input section 201 so as to input a message corresponding to the contents of the chat displayed on the display section 202. Each of the terminal devices 21 to 2n discriminates whether some kind of message is input or not (Step S105). In the case where a message is input, the communications processor 204 sends the message to the server device 1 through the Internet 3 (Step S106). The flow advances to the procedure of Step S107. On the contrary, in the case where no message is input, the flow advances to the procedure of Step S107.

In Step S107, each of the terminal devices 21 to 2n discriminates whether an instruction of logging out from the chat room is input by manipulation of the input section 202. If the instruction of logging out is not input, the flow returns to the procedure of Step S101. On the contrary, in the case where the instruction of logging out from the chat room is input, each of the terminal devices 21 to 2n sends a message representing the togging out from the communications processor 204 through the Internet 3 (Step S108), and the process of this flowchart is terminated.

Figure 4:
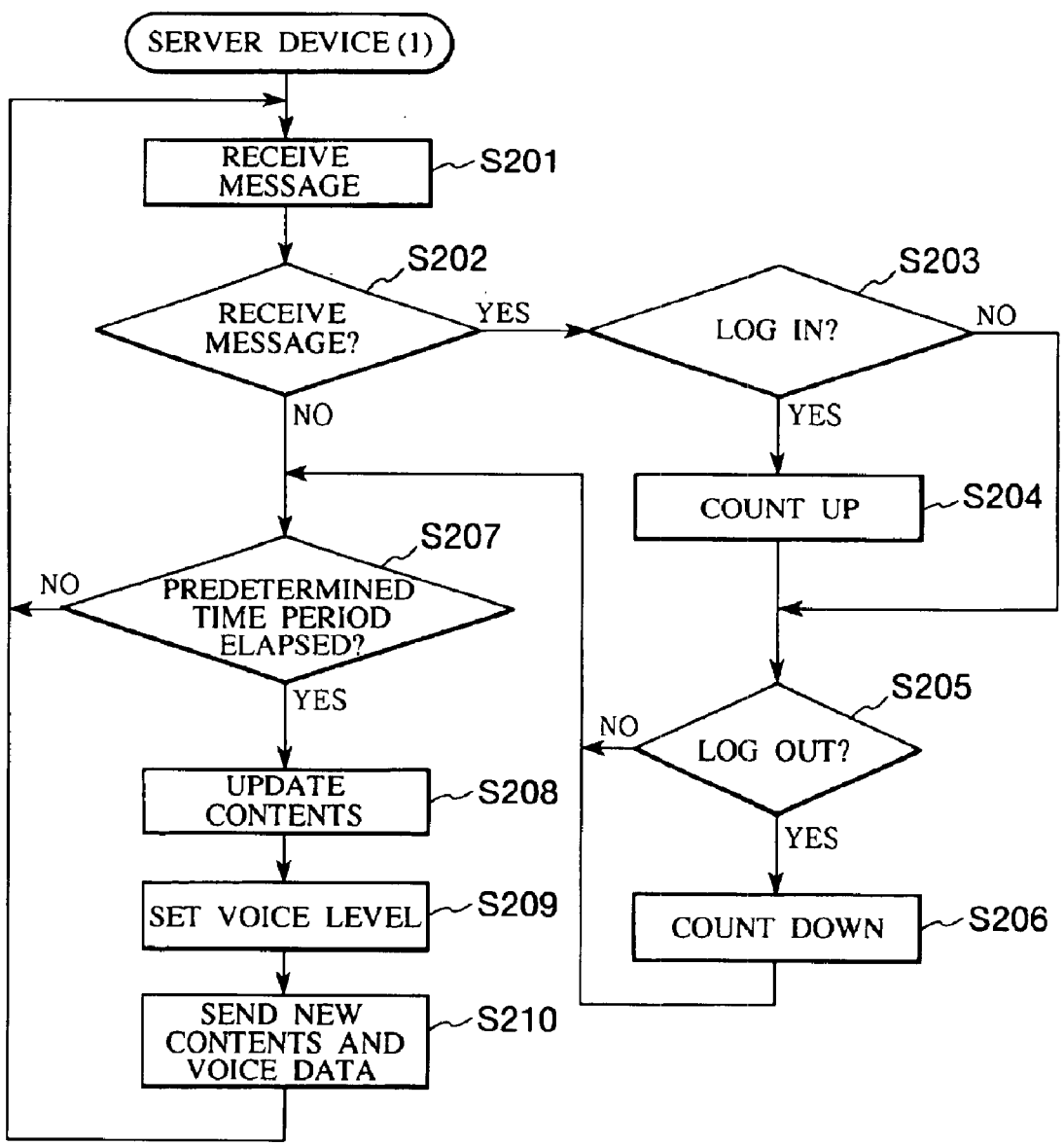
FIG. 4 is a flowchart showing a process which is carried out by the server device in the first embodiment of the present invention.

In the server device 1, there are carried out a process for periodically updating the contents of the chat in accordance with the progress of the chat, a process for sending the updated contents to the terminal devices 21 to 2n which have logged in to the chat and have not logged out therefrom, and a process for sending a voice conforming to the number of the participants in the chat room. FIG. 4 is a flowchart showing a process which is carried out by the server device 1, in the above situation. The process described as one to be performed by the server device 1 is a process which is substantially performed by the CPU 1A executing the program stored in the memory 1B. The process described as one to be performed by each of the sections 101 to 104 is performed by the CPU 11A executing the program stored in the memory 1B so as to control the corresponding hardware (the same applies below).

The server device 1 waits the communications processor 103 receiving a message (including a message indicating a user logging into or out from the chat room) from any of the terminal devices 21 to 2n (Step S201). Then, the server device 1 discriminates whether the communications processor 103 has received the message from any of the terminal devices 21 to 2n (Step S202). When discriminated that no message is received, the flow advances to the procedure of Step S207.

When discriminated that the message is received, the access number counter 104 discriminates whether the received message is one indicating the logging in to the chat room (Step S203). When discriminated that the received message is one indicating the logging in to the chat, the access number counter 104 counts up the current number of participants of the chat room (Step S204), and the flow advances to the procedure of Step S205. Otherwise, the flow directly advances to the procedure of Step S205.

In Step S205, the access number counter 104 further discriminates whether the received message is one indicating logging out from the chat room. When discriminated that the received message is one indicating the logging out from the chat room, the access number counter 104 counts down the current number of participants (Step S206), and the flow advances to the procedure of Step S207. Otherwise, the flow directly advances to the procedure of Step S207.

In Step S207, the content provider 101 discriminates whether a predetermined time period has elapsed since the last time the contents had been updated. When discriminated that the predetermined time period has elapsed, the content provider 101 updates the contents in accordance with the message (except any message indicating the logging in to or out from the chat room) received in Step S201. That is, the content provider 101 creates new contents which are formed by adding the received message into the contents of the chat (Step S208).

Then, the voice provider 102 refers to the value counted by the access number counter 104, and creates new voice data including a set level of a voice to be output in accordance with the counted value (Step S209). The communications processor 103 sends the new contents created in Step S208 and the new voice data created in Step S209 to the terminal devices 21 to 2n which have logged in to the chat room through the Internet 3 and have not logged out therefrom (Step S210).

When discriminated that the predetermined time period has not elapsed in Step S207, and after the contents and voice data are sent in Step S210, the flow returns to the procedure of Step S201, and the server device 1 repeats the above-described procedures.

Operations of the network system of this embodiment will now specifically be described with reference to FIGS. 5A to 5H. FIGS. 5A, 5C, 5E and 5G show the contents of the chat room which are periodically updated and provided by the server device 1 and displayed on the display section 202 of each of the terminal devices 21 to 2n.

FIGS. 5B, 5D, 5F and 5H each exemplarily shows a level of a voice in a particular case.

Figure 5A:
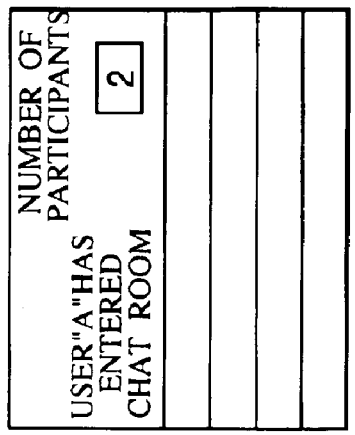
FIGS. 5A to 5H are diagrams each showing the relationship between a number of participants of a chat room and a level of a voice output from a terminal device.

As illustrated in FIG. 5A, a user "A" operates the input section 201 of his/her terminal device, thereby to log in to a chat room provided as contents by the server device 1. Let it be supposed that the number of participants in the chat room (the number of users entered the chat room) is now two. Let it be supposed also that a level of a voice of the voice data provided by the voice provider 102 of the server device 1 is at a level shown in FIG. 5B.

Figure 5B:
Figure 5C:
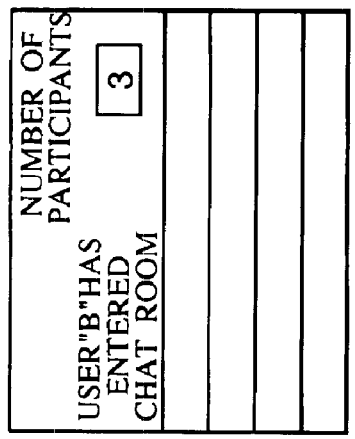
Figure 5D:

As illustrated in FIG. 5C, a user "B" operates the input section 201 of his/her terminal device, thereby to log in to the chat room provided as contents by the server device 1. Thus, the number of participants in the chat room is three which is larger by one than in the case of FIG. 5A. At this time, the voice provider 102 of the server device 1 raises the level of a voice in the voice data to be provided, as shown in FIG. 5B.

Figure 5E:
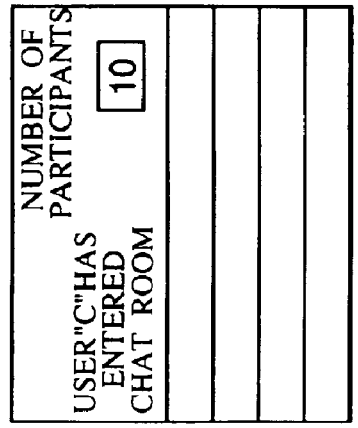
Figure 5F:
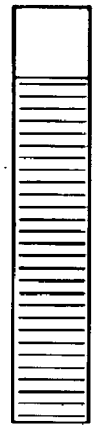

Further, as shown in FIG. 5E, after several more users have logged in to the chat room and further user "C" has logged in to the chat room, the number of participants in the chat room becomes ten. At this time, the voice provider 102 of the server device 1 raises the level of a voice in the voice data to be provided by several levels, as shown in FIG. 5F.

Figure 5G:
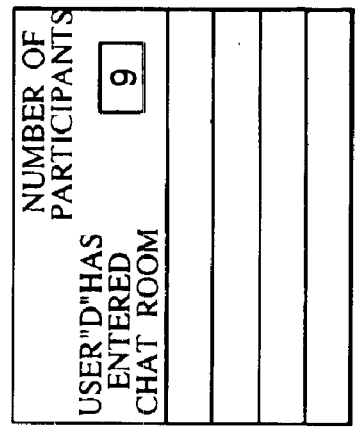
Figure 5H:

Then, as shown in FIG. 5G, a user "D" operates the input section 201 of his/her terminal device, thereby to log out from the chat room provided as contents by the server device 1. Hence, the number of the participants in the chat room is nine which is smaller than the case shown in FIG. 5E. At this time, the voice provider 102 of the server device 1 lowers the level of the voice to be provided than the level of the voice shown in FIG. 5F.

In this manner, the procedures of logging in to and out from the chat room are repeated. However, the voice provider 102 of the server device 1 is to occasionally provide voice data including a level of a voice which is set in accordance with the number of participants in the currently-presented chat room.

As explained above, in the network system according to this embodiment, the more the number of participants in the chat which is provided as contents by the server device 1, the higher the level of a voice (e.g., a noise made by the participants) to be output as the background noise in the terminal devices 21 to 2n. Thus, the circumstances, where a large voice is generated if there are a large number of participants and which are likely to happen in the real-life conversation, can be created in the terminal devices, thus enhancing the feeling of speaking up in a real-life chat.

Second Embodiment

In this embodiment, explanations will now be made to a system, which presents the frequency (i.e., the frequency a message is transmitted) a user participates a chat room provided as a network service so as to give the user the feeling of actually speaking up in a real-life chat. The structure of the network system which is adapted for this embodiment is the same as that explained in the first embodiment. The processes which are carried out in the terminal devices 21 to 2n are also the same as those explained in the first embodiment. In this embodiment, some processes to be carried out by the server device 1 are distinctive from those of the server device 1 in the first embodiment.

Figure 6:
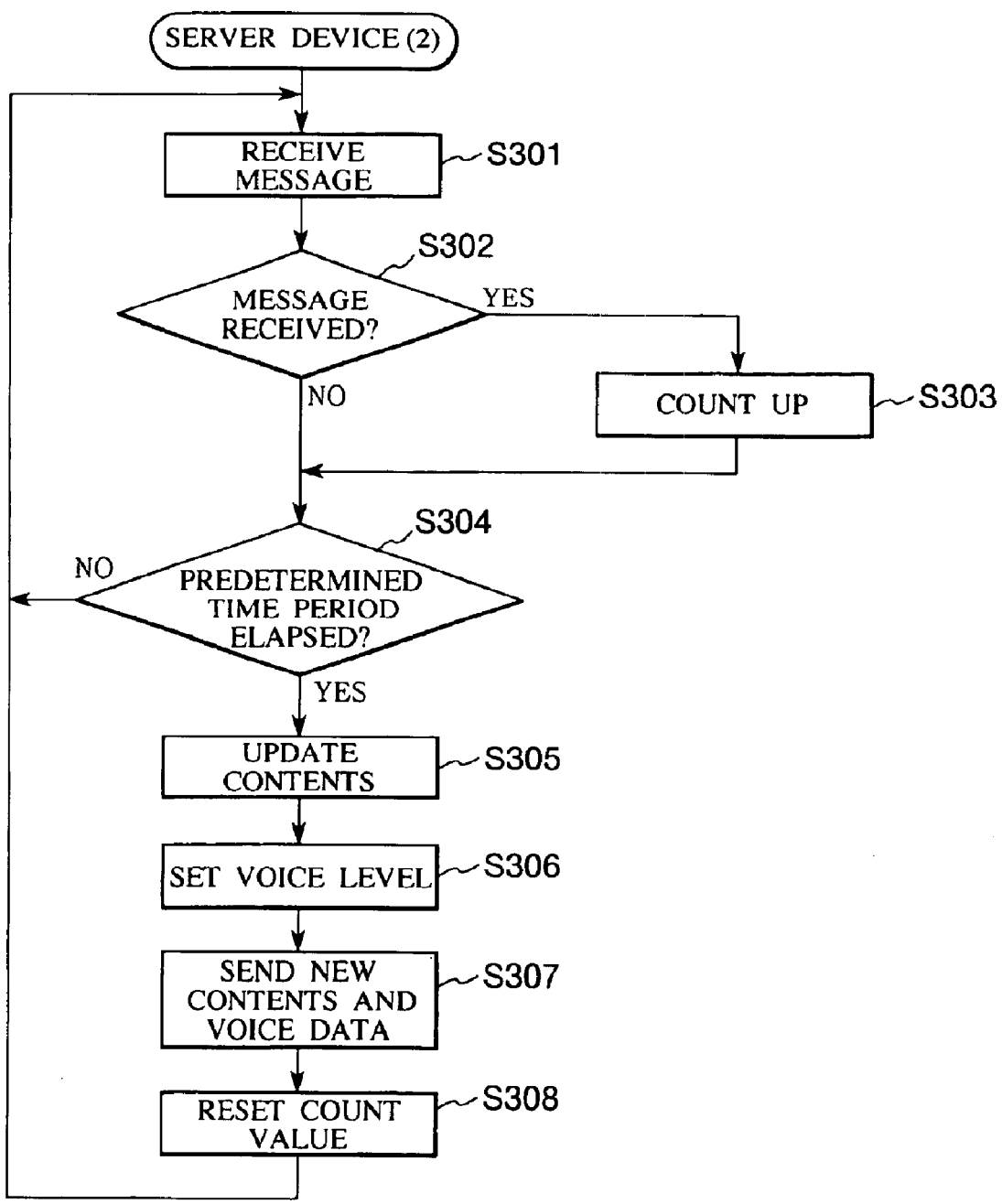
FIG. 6 is a flowchart showing a process which is carried out by a server device in the second embodiment of the present invention.

FIG. 6 is a flowchart showing the process which is carried out by the server device 1 in this embodiment. The server device 1 waits the communications processor 103 receiving a message (except any message indicating logging in to or out from a chat room, and this can be applied in Step S302 as will be explained later) (Step S301). The server device 1 discriminates whether the communications processor 103 has received a message from any of the terminal devices 21 to 2n (Step S302).

When discriminated that the communications processor 103 has received a message, the access number counter 104 counts the current number of messages in accordance with the number of received messages (Step S303), and the flow advances to the procedure of Step S304. On the contrary, when discriminated that no message is received in Step S302, the flow directly advances to the procedure of Step 304.

The procedures of Steps S304 to S307 are the same as the procedures of Steps S207 to S210 described in the first embodiment. However, in this embodiment, after the communications processor 103 transmits contents and voice data in Step S307, the access number counter 104 resets the counted value (Step S308). Thereafter, the flow advances to the procedure of Step S301.

As explained above, in the network system according to this embodiment, the more the number of messages sent to the chat room provided as contents by the server device 1, the higher the level of a voice (e.g., a noise made by people) to be output as the background voice in the terminal devices 21 to 2n. Hence, the circumstances, where the large background voice is generated if there are a large number of participants speaking in the chat room and which are likely to happen in the real-life conversation, can be created in the terminal devices, thus enhancing the feeling of actually speaking up in a real-life chat.

Third Embodiment

In this embodiment, explanations will now be made to a system which is provided as a network service and presents the reaction of users to a comedian's show to be transmitted so as to give the feeling of actually observing a show to users. The structure of the network system adapted for this embodiment is the same as that explained in the first embodiment. Note that the contents provided by the content provider 101 and the voice data provided by the voice provider 102 are distinctive from those in the first embodiment. The input section 201 of each of the terminal devices 21 to 2n is used for inputting the reaction of users.

The content provider 101 sequentially provides the contents to the users while periodically updating the data of the contents in such a way that a pre-given comedian's show progresses. The voice provider 102 sequentially provides voice data representing laughter, while periodically updating a level of a voice in accordance with a value counted by the access number counter 104, for example.

A user not only sends an instruction for logging in to and out from a show, but also performs predetermined inputting (for example, inputting through the return key) through the input section 201 if the user thinks a comedian's show is funny as displayed on the display section 202 and provided as the contents of the terminal devices 21 to 2n. Of course, whether the user thinks the comedian's show is funny or not may be influenced by the reaction of other users, i.e., by the loudness of a voice (laughter) output from the voice output section 203.

Figure 7:
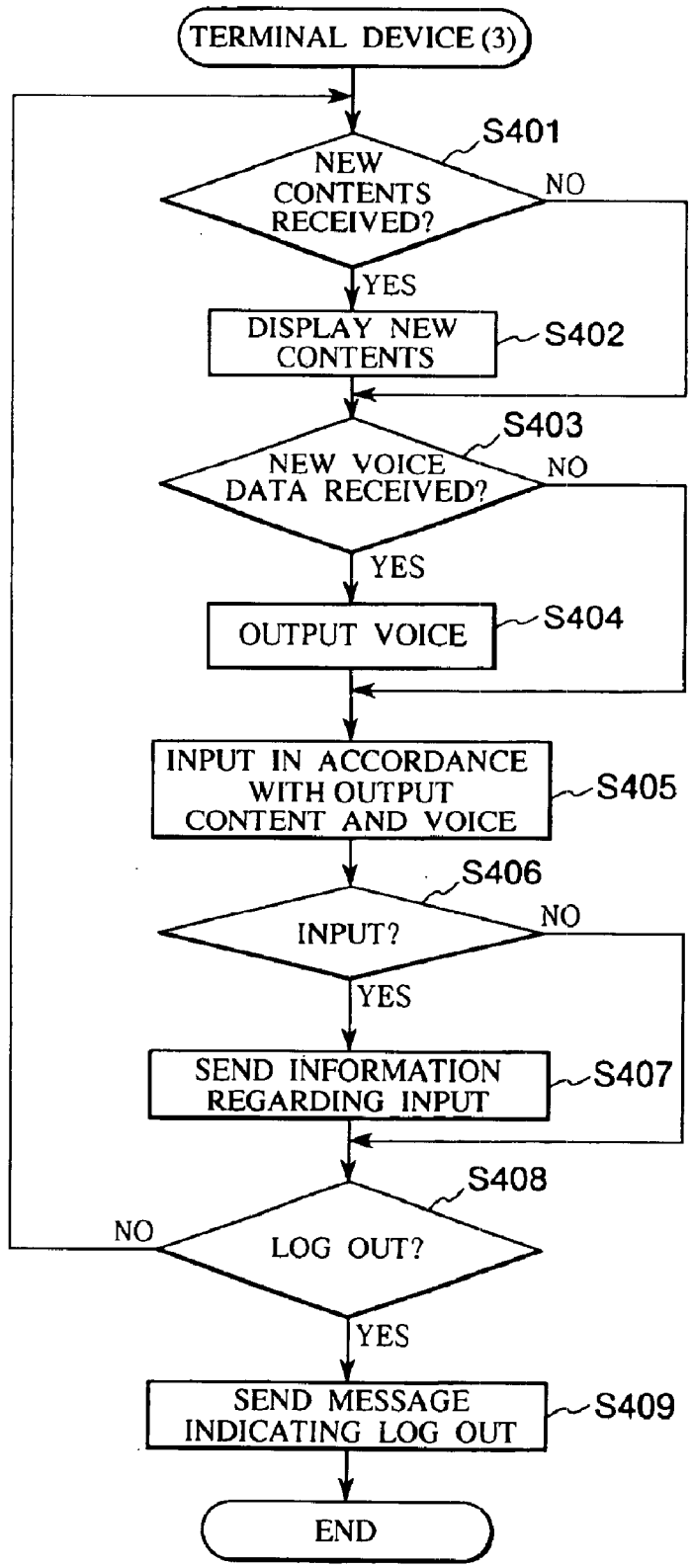
FIG. 7 is a flowchart showing a process which is carried out by a terminal device in the third embodiment of the present invention.

Operations of the network system of this embodiment will now be described. Up to the process for logging in to a show, the processes which are carried out by the terminal devices 21 to 2n are the same as those described in the first embodiment. FIG. 7 is a flowchart showing the process which the terminal devices 21 to 2n carry out after having logged in to a show in this embodiment.

Each of the terminal devices 21 to 2n discriminates whether its communications processor 204 has received new contents (updated contents of the comedian's show) transmitted from the server device 1 through the Internet 3 (Step S401). When discriminated that the communications processor 204 has received the new contents, the display section 202 displays the new contents (Step S402), and the flow advances to the procedure of step S403. When discriminated that the communications processor 204 has not received the new contents, the display section 202 continuously displays previously-received contents.

In Step S403, each of the terminal devices 21 to 2n discriminates whether its communications processor 204 has received new voice data sent from the server device 1 through the Internet 3. When discriminated that the communications processor 204 has received new voice data, the voice output section 203 outputs a voice corresponding to the new voice data (Step S404), and the flow advances to the procedure of Step S405. When discriminated that the communications processor 204 has not received new voice data, the voice output section 203 continuously outputs a voice corresponding to previously-received voice data.

In Step S405, while watching the contents displayed on the display section 202, i.e., the contents of the comedian's show, the user of each of the terminal devices 21 to 2n, who has heard the voice output from the voice output section 203, performs predetermined inputting through the input section 201 if the user thinks the comedian's show provided as the contents is funny. Each of the terminal devices 21 to 2n discriminates whether predetermined inputting is performed through the input section 201 (Step S406).

When discriminated that predetermined inputting is performed through the input section 201, the communications processor 204 sends information regarding this predetermined inputting to the server device 1 through the Internet 3 (Step S407), and the flow advances to the procedure of Step S408. On the contrary, when discriminated that no predetermined inputting is performed through the input section 201 in step S406, the flow directly advances to the procedure of Step S408.

In Step S408, each of the terminal devices 21 to 2n discriminates whether an instruction of logging out from the comedian's show is input by manipulation of the input section 201. When discriminated that the instruction is not input, the flow returns to the procedure of Step S401. On the contrary, when discriminated that the instruction is input, each of the terminal devices 21 to 2n transmits from the communication processor 204 a message representing logging out from the comedian's show to the server device 1 through the Internet 3 (Step S409), and the process of this flowchart is terminated.

Figure 8:
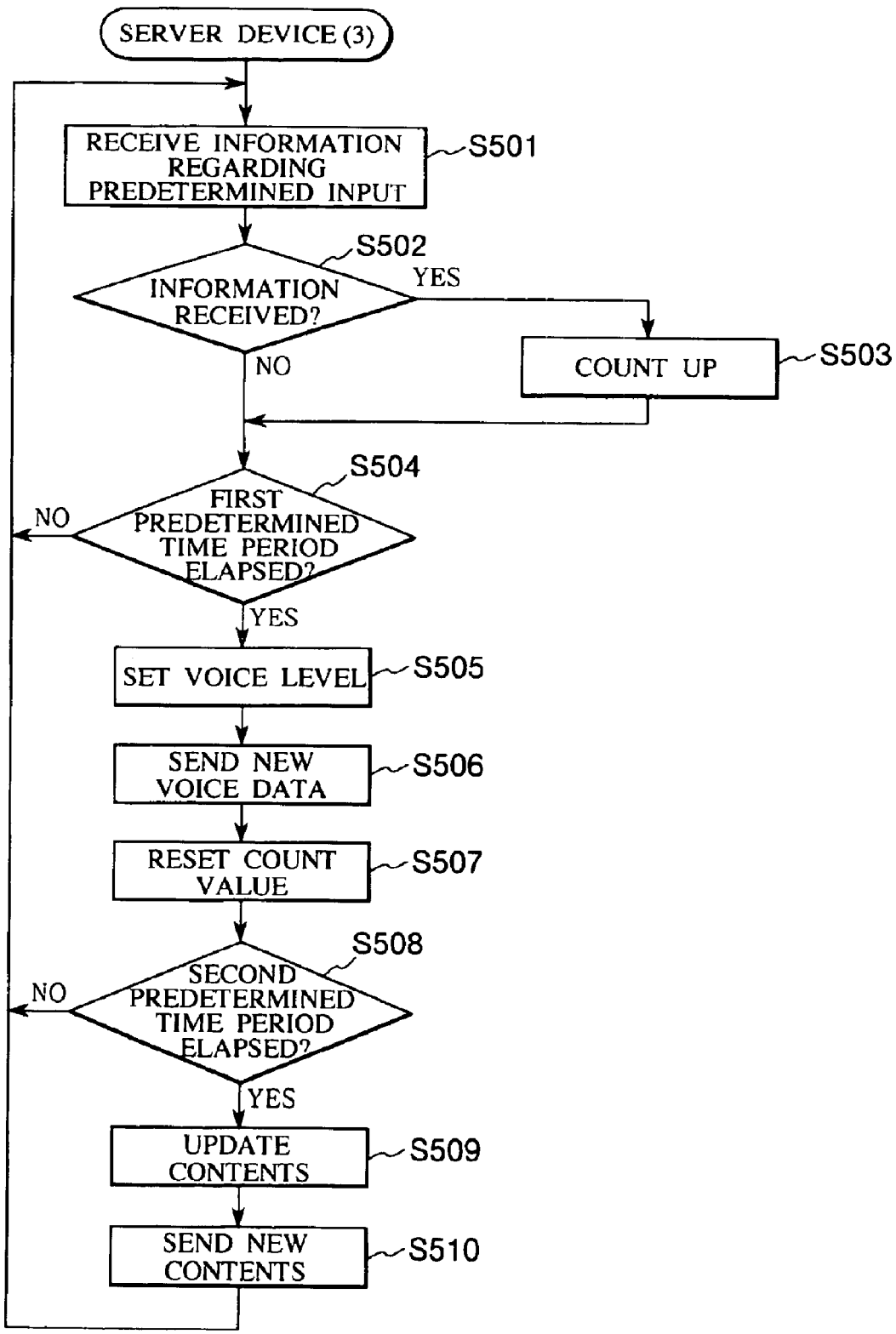
FIG. 8 is a flowchart showing a process which is carried out by a server device in the third embodiment of the present invention.

On the contrary, the server device 1 periodically updates the contents so that the comedian's show is sequentially going well, and transmits the contents to any of the terminal devices 21 to 2n which has logged in to the server device 1 and has not yet logged out therefrom, as one of the audience of the show. At the same time, the server device 1 carries out a process for transmitting a voice conforming to the reaction of the users of the terminals 21 to 2n. FIG. 8 is a flowchart showing the process which is carried out by the server device 1 in this embodiment.

The server device 1 waits the communications processor 103 receiving information regarding any predetermined input which is input through the input section 201 of each of the terminal devices 21 to 2n (Step S501). The server device 1 discriminates whether the communications processor 103 has received information regarding any predetermined input from the terminal devices 21 to 2n (Step S502). When discriminated that the communications processor 103 has received information regarding any predetermined input, the access number counter 104 counts up the present count value in accordance with the number of times the information regarding predetermined input is received (Step S503), and the flow advances to the procedure of Step S504. On the contrary, when discriminated that the communications processor 103 has not received any information regarding predetermined input, the flow advances to the procedure of Step S504.

In Step S504, the voice provider 102 discriminates whether the first predetermined time period has elapsed since the last time the level of the voice had been set. When discriminated that the first predetermined time period has elapsed, the voice provider 102 refers to the value counted by the access number counter 104, sets a level of a voice to be output in accordance with the value, and creates new voice data (Step S505).

The communications processor 103 sends the voice data newly created in Step S505 to any of the terminal devices 21 to 2n which have logged in to the contents through the Internet 3 and having not logged out therefrom (Step S506). Further, the access number counter 104 resets the counted value (Step S507).

Next, the content provider 101 discriminates whether the second predetermined time period has elapsed since the last time the contents had been updated (Step S508). Note that the second predetermined time period is longer than the first predetermined time period. When discriminated that the second predetermined time period has elapsed, the content provider 101 updates the contents, i.e., creates new contents representing the progressed comedian's show (Step S509). Then, the communications processor 103 sends the contents newly created in step S509 to any of the terminal devices 21 to 2n which have logged in to the contents through the Internet 3 and have not logged out therefrom (Step S510).

When discriminated that the first predetermined time period has not elapsed in Step S504, when discriminated that the second predetermined time period has not elapsed in Step S508, or after the new contents have been sent in Step S510, the flow returns to the procedure of Step S501, and the server device 1 repeats the above procedures.

As explained above, in the network system according to this embodiment, the larger the audience who think the comedian's show provided as contents by the server device 1 is funny, the higher the level of a voice (e.g., laughter) to be output as the background voice in the terminal devices 21 to 2n. Thus, the circumstances, where roars of laughter are generated if a large audience think the comedian's show is funny and which are likely to happen in the real-life comedian's show, can be made in the terminal devices, thus enhancing the feeling of being present at an actual comedian's show while visiting the comedian's show provided as contents.

Fourth Embodiment

Figure 9:
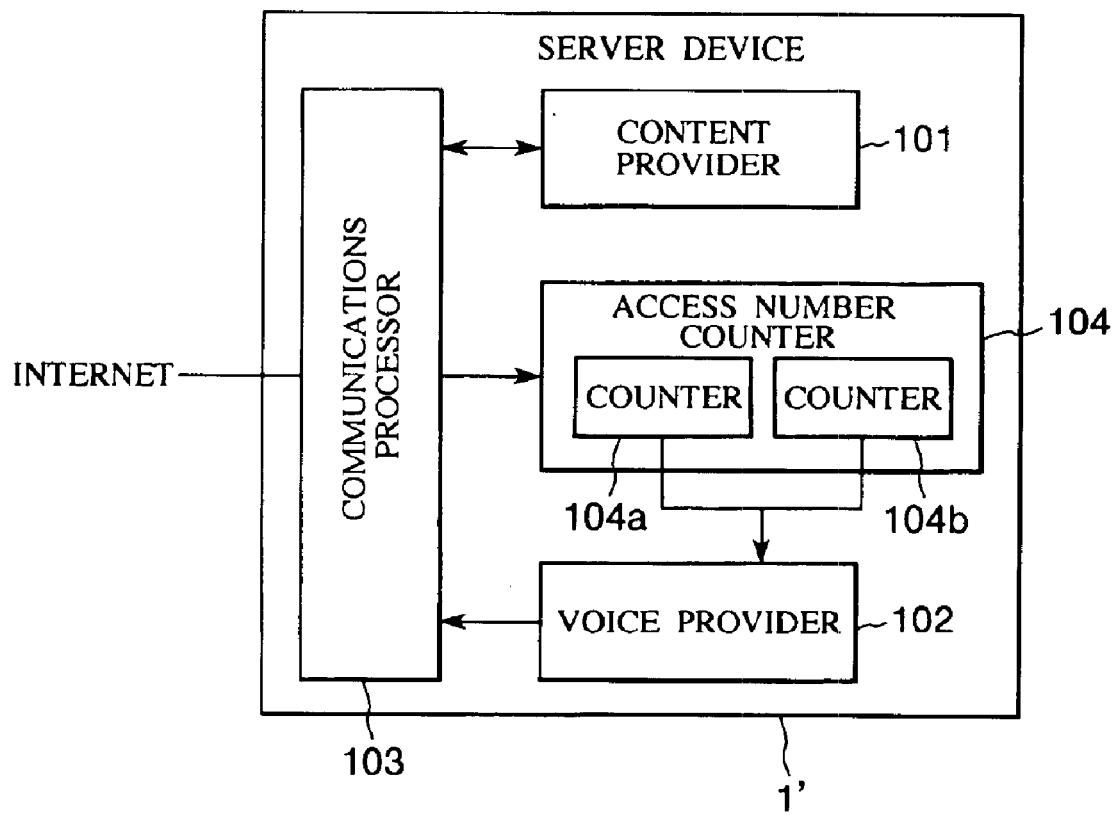
FIG. 9 is a block diagram showing the structure of a server device in the fourth embodiment of the present invention.

In this embodiment, explanations will now be made to a system, wherein users are the audience of a debate and which presents the reaction of the audience to the debate so as to give the feeling of being listening to the debate. The structure of the network system of this embodiment is almost the same as that explained in the first to third embodiments. However, as illustrated in FIG. 9, the access number counter 104 which is included in a server 1' has a plurality of counters 104a and 104b.

A debate is an argument wherein opposing groups of "Yes" and "No" speakers discuss about an issue. The content provider 101 provides contents of the argument. Each of the users of the terminal devices 21 to 2n inputs through the input section 201 information (hereinafter referred to as either "Supporting Yes" and "Supporting No") representing which side, "Yes" or "No", of the argument he/she supports. The "Supporting Yes" and "Supporting No" are sent to the server device 1' from the communications processor 204 through the Internet 3. The counters 104a and 104b count the number of the "Supporting Yes" and "Supporting No" received by the communications processor 103. The voice provider 102 modifies the representation of a voice in association with the number of "Supporting Yes" and "Supporting No" counted by the counters 104a and 104b and the ratio of the two (or the difference between the two), and provides the terminal devices 21 to 2n with the modified representation. The content provider 101 provides as the contents not only the contents of the debate, but also information representing a graph showing the ratio of the "Supporting Yes" to "Supporting No" and information indicating whether the users as the audience show their enthusiasm.

Operations of the network system of this embodiment will now be explained. The procedures carried out by the terminal devices 21 to 2n are the same as those (FIG. 7) of the terminal devices 21 to 2n as described in the third embodiment, except the procedure of Step S405. In this embodiment, in Step S405, each of the users of the terminal devices 21 to 2n selects and inputs either of "Supporting Yes" and "Supporting No" through the input section 201. The procedures carried out by the server device 1' are the same as those (FIG. 8) described in the third embodiment. However, the following points, as will be explained below, are distinctive from those described in the third embodiment.

In Step S503, the access number counter 104 discriminates whether received is the "Supporting Yes" or the "Supporting No". When discriminated that the received is the "Supporting Yes", the access number counter 104 counts up the present count value of the counter 104a. On the contrary, when discriminated that the received is the "Supporting No", the access number counter 104 counts up the present count value of the counter 104b.

In Step S505, the voice provider 102 sets a level of a voice to be output, in accordance with the sum of the count values of the two counters 104a and 104b of the access number counter 104. The voice provider 102 sets the contents of the voice to be output, in accordance with a ratio of the count values of the respective counters 104a and 104b. The voice provider 102 generates voice data in accordance with the set level and the contents. The content provider 101 creates a graph on the basis of the ratio of the count values of the respective counters 104a and 104b, and makes a comment on the basis of the sum of the count values. The created graph and comment are included in a part of the contents.

In Step S506, the communications processor 103 sends the voice data created in Step S505 and the information representing the graph and the comment included in the part of the contents to each of the terminal devices 21 to 2n which have logged in to and have not logged out from the debate. After each of the terminal devices 21 to 2n receives the information representing the graph and the comment, the display section 202 displays the graph and the comment in Step S402, while the voice output section 203 outputs a voice in Step S404.

Figure 10:
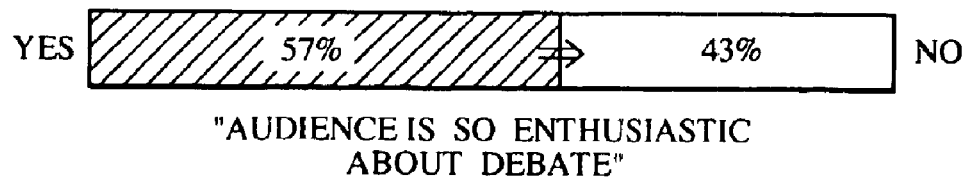
FIG. 10 is a diagram showing an example of a graph which is displayed on a terminal device in the fourth embodiment of the present invention.

FIG. 10 is a diagram showing the graph and comment to be displayed as the part of the contents on the display section 202 of each of the terminal devices 21 to 2n. As illustrated, the ratio of the "Supporting Yes" to the "Supporting No" is shown in the form of a graph. In this case, if there is an increase in the number of "Supporting Yes", the portion of the "Supporting Yes" in the graph increase as denoted with an arrow. Under the graph, there is a comment "The audience is so enthusiastic about the debate". This comment entirely represents the number (the sum of the count values of the counters 104a and 104b) of reaction of the audience. Hence, the comment differs depending on the sum of the count values at time intervals.

As described above, in the network system according to this embodiment, the more the audience (the sum of the count values of the counters 104a and 104b) reacting the debate which is provided as the contents by the server 1', the higher the level of a voice (e.g., clapping of hands) to be output in each of the terminal devices 21 to 2n. The voice data changes depending on the ratio (the ratio of the count values of the counters 104a and 104b) of the "Supporting Yes" to the "Supporting No". Hence, the circumstances, where a voice very much similar to the reaction of the audience in the real-life debate room is made, can be created and give the feeling of being present at an actual debate room to the users while visiting the debate as the contents. Further, on the display section of each of the terminal device 21 to 2n, the graph illustrated in FIG. 10 can be displayed, thus enhancing the feeling of being present at the debate room not only auditorily, but also and visually.

Fifth Embodiment

Figure 11:
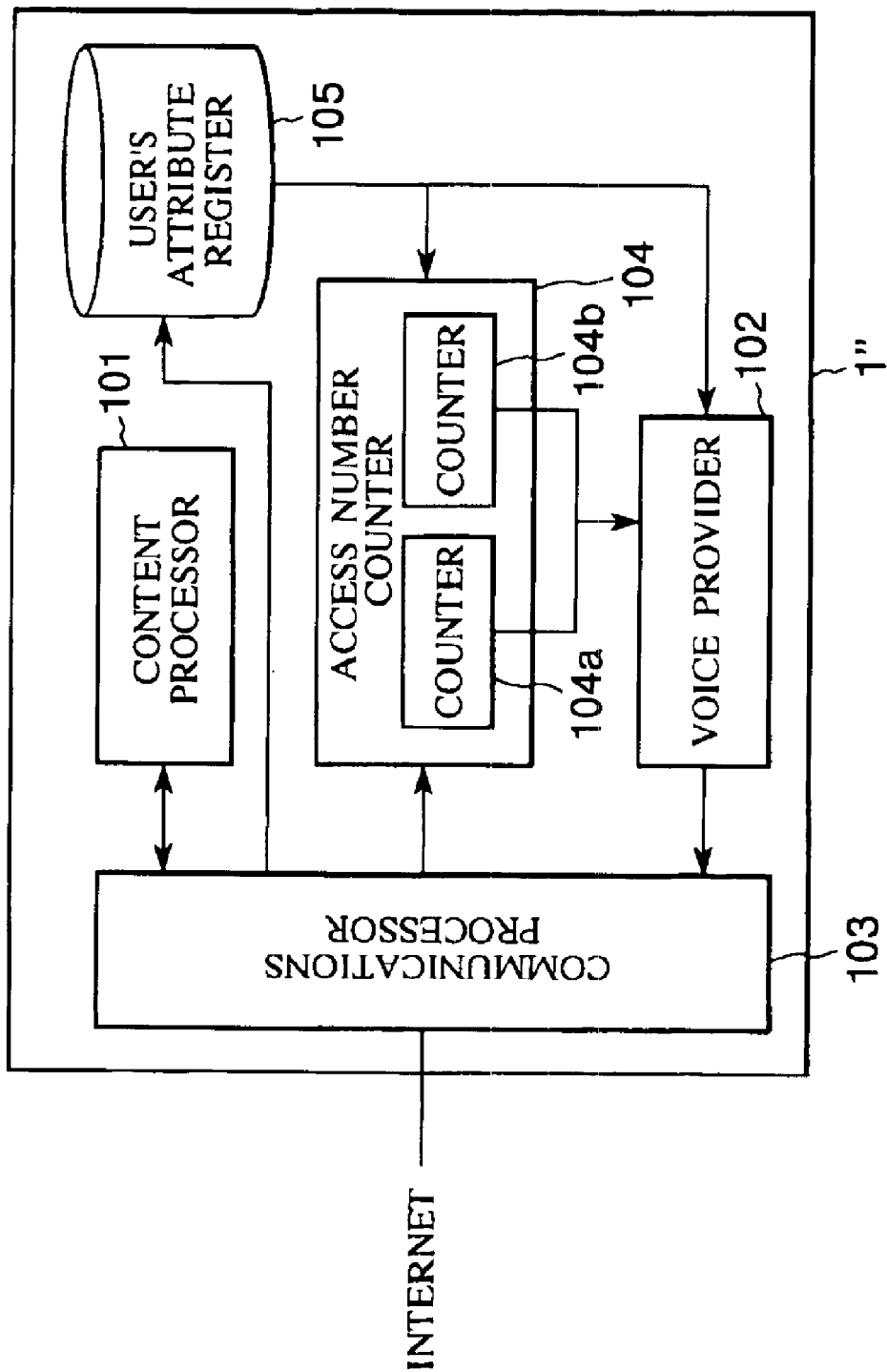
FIG. 11 is a block diagram showing the structure of a server device in the fifth embodiment of the present invention.

In this embodiment, explanations will now be made to a system, which provides broadcasting of a baseball live game as contents, for example, and wherein a user will cheer either team of the game and which gives the feeling of being present at a cheer battle, by way of example. In the network system of this embodiment, as illustrated in FIG. 11, the structure of a server device 1" differs from that described in the first to fourth embodiments. The server device 1" shown in FIG. 11 includes not only the content provider 101, the voice provider 102, the communication processor 103 and the access number counter 104, but also a user's attribute register 105. The user's attribute register 105 registers either team each user of the terminal devices 21 to 2n cheers. This registration to the user's attribute register 105 is performed when each of the terminal devices 21 to 2n has just logged in to the cheer battle which is provided as contents.

The access number counter 104, likewise in the fourth embodiment, has two counters 104a and 104b. However, information regarding input to be sent to the server device 1" from each of the terminal devices 21 to 2n differs from that described in the fourth embodiment, and there is only one type of information regarding the input. When the information regarding input from each of the terminal devices 21 to 2n is received, the access number counter 104 refers to the user's attribute register 105, and counts up the value of either of the counters 104a and 104b which corresponds to either team cheered by any of the terminal devices 21 to 2n. The voice provider 102 creates voice data for each team in accordance with the count values of the counters 104a and 104b, refers to the user's attribute register 105, and provides any of the terminal devices 21 to 2n with voice data corresponding to either team cheered by the corresponding one of the terminal devices 21 to 2n.

Operations of the network system of this embodiment will now be explained. The procedures carried out by the terminal devices 21 to 2n are the same as those (FIG. 7) of the third embodiment as a whole. However, the procedure when logging in to the contents of the cheer battle differs from the procedure described in the third embodiment. In this embodiment, when logging in to the contents of the cheer battle, the user of each of the terminal devices 21 to 2n inputs one team to be cheered through the input section 201. The communications processor 204 sends the input together with a request for logging in to the contents to the server device 1". The procedure of Step S405 also differs from that described in the third embodiment. In the step, the user of each of the terminal devices 21 to 2n inputs (hereinafter referred to as cheering-input) information through the input section 201 when the user intends to give an exciting cheer.

The procedures carried out by the server device 1" are almost the same as those (FIG. 8) in the third embodiment. However, the following points, as will be explained below, differ from those of the third embodiment. When any of the terminal devices 21 to 2n is logging in to the contents provided by the server device 1", the server device 1" registers into the user's attribute register 105 the information regarding the team to be cheered which is sent together with the request for logging in to the content, and identification information (such as an 1D number or the like) of each of the terminal devices 21 to 2n, in association with each other.

In Step S503, the access number counter 104 refers to the user's attribute register 105, and determines from which user of the terminal devices 21 to 2n, i.e. the user cheers which one of teams, the information are sent. When determined the information is sent from a user cheering one team (supposing team "A"), the access number counter 104 counts up the count value of the counter 104a. When determined that the information is sent from a user cheering the other team (supposing team "B"), the access number counter 104 counts up the count value of the counter 104b.

In Step S505, the voice provider 102 checks the count values of the two counters 104a and 104b in the access number counter 104, and generates voice data for the team "A" and voice data for the team "B". For example, the voice data for the team "A" is generated under the condition that if there are a great number of the "cheering-inputs" for the team "A" (the count value of the counter 104a), the level of a cheer as arose from a near distance is set high. On the contrary, the voice data for the team "A" is generated under the condition that if there are a great number of the "cheering-inputs" for the team "B" (the count value of the counter 104b), the level of a cheer as arose from a far distance is set high.

In Step S506, the voice provider 102 refers to the user's attribute register 105. Then, the voice provider 102 sends the voice data for the team "B" to any of the terminal devices 21 to 2n which has been registered as one to cheer the team "A", and the voice data for the team "B" to any of the terminal devices 21 to 2n which has been registered as one to cheer the team "B", from the communications processor 103 through the Internet 3.

The relationship between the number of "cheering-inputs" and the number of cheers will now specifically be explained with reference to FIGS. 12A to 12C. Even if the levels of the cheers from a near distance and the cheers from a far distance seem the same in FIGS. 12A to 12C, the level of a voice actually output from the voice output section 203 of each of the terminal devices 21 to 2n is high in the near distance cheers. The levels of the cheers shown in FIGS. 12A to 12C are the relative levels of the cheers between the maximum and minimum levels. Hence, the levels shown therein are not the levels of the voice to be actually output from the voice output section 203.

In the most general case, as illustrated in FIG. 12A, the number (the count value of the counter 104a) of the "cheering-inputs" for the team "A" and the number (the count value of the counter 104a) of the "cheering-inputs" for the team "B" are approximately in the middle and about the same. In this case, approximately the same level of voice is output from the voice output section 203 of the terminal devices 21 to 2n of the users cheering the team "A" in both of the near-distance cheers and the far-distance cheers. The same applies into the voice output from the voice output section 203 of the terminal devices 21 to 2n of the users cheering the team "B". For example, in the case where the team "A" is having a great chance of winning the game, the number of the "cheering-inputs" for the team "A" is large and the number of the "cheering-inputs" for the team "B" is small, as shown in FIG. 12B. In such a case, the level of the voice output from the voice output section 203 of each of the terminal devices 21 to 2n of users cheering the team "A" is higher in the near-distance cheers than that in the far-distance cheers. The level of the voice output from the voice output section 203 of the terminal devices 21 to 2n of the users cheering the team "B" is lower in the near-distance cheers than that in the far-distance cheers.

On the other hand, in the case where the team "B" is having a great chance of winning a game, the number of the "cheering-inputs" for the team "A" is small and the number of the "cheering-inputs" for the team "B" is large, as shown in FIG. 12C. In such a case, the level of the voice output from the voice output section 203 of each of the terminal devices 21 to 2n of users cheering the team "A" is lower in the near-distance cheers than that in the far-distance cheers. The level of the voice output from the voice output section 203 of the terminal devices 21 to 2n of the users cheering the team "B" is higher in the near-distance cheers than that in the far-distance cheers.

As explained above, in the network system according to this embodiment, in each of the terminal devices 21 to 2n, the more the cheers for the team the user of each terminal device supports, the higher the level of the cheer voice as being arose from a near distance. On the other hand, the more the cheers for the opponent team, the higher the level of the cheer voice as being arose from a far distance. Hence, the voice output section 203 outputs a voice which gives the users the feeling of watching the baseball game on the side of the supporting team at the baseball stadium, thus enhancing the feeling of actually being present at the cheering battle which is provided as the contents.

Modification

The present invention is not limited to the above first to fifth embodiments, and various changes and modifications can be made. A modification of the above-described embodiments which can be adapted to the present invention will now be explained.

The server device 1 (1', 1") provides the terminal devices 21 to 2n with, as the contents, the chat room in the above-described first and second embodiments, the comedian's show in the third embodiment, the debate in the fourth embodiment, and the cheering battle in the fifth embodiment. However, the contents to be provided in the present invention are not limited to the above, and any other types of contents, such as any contents to be periodically provided to the terminal devices which have logged in to the server device and have not logged out therefrom, or any contents to be provided to the terminal device which has sent a predetermined request to the server device, can be adapted.

In the above-described first embodiment, the voice provider 102 provides and sends the voice data including a newly-set voice level every time a predetermined time period elapses, to the terminal devices 21 to 2n from the communications processor 103 through the Internet 3. However, when there is a change in the number (the count value of the access number counter 104) of the currently-logged-in terminal devices, as a result of terminal devices further logging in to the server device or logging out from the server device, the voice provider 102 may provide the terminal devices with voice data including a newly-set voice level.

What the access number counter 104 counts are: the number of terminal devices currently-logged in to and having not logged out from the server device in the above-described first embodiment; the number of messages sent from the terminal devices 21 to 2n in a predetermined time period in the second embodiment; and the number of inputs from the terminal devices 21 to 2n through the input section 201 in a predetermined time period in the third to fifth embodiments. However, the access number counter 104 may count the total number of the accesses of the terminal devices 21 to 2n since the content provider 101 starts providing predetermined contents.

The access number counter 104 may count up/down in accordance with time intervals at which the communications processor 103 receives information from the terminal devices 21 to 2n, instead of counting the number of currently-logged-in terminals or the number of messages. For example, in the case where one terminal device has actually logged out from the server device and has not sent any information for a predetermined period, the access number counter 104 may recognize such a terminal device as having logged out, and may count down. In the case where the information is again sent from the terminal device, the access number counter 104 may count up. Having performed this, under the assumption that there is a user of a terminal device not participating chatting even the terminal device has logged in to the chat room, the count value for giving the users the feeling of actually speaking out at in actual chat can be set.

A threshold value may be set for the count value of the access number counter 104. In the case where the value counted by the access number counter 104 does not exceed a threshold value, the voice provider 102 can set the level of the voice data to "0". In the case where the server device 1 (1', 1") receives no information from the terminal devices 21 to 2n over a predetermined period, the voice data provider 102 can set the voice data to be provided to "0". Having performed this, the silent state, wherein no one speaks up in the chat or most of the users think the comedian's show is boring, can be realized as voice data.

In the first to fifth embodiments, the level of the output voice in the voice data provided by the voice provider 102 may be changed on the basis of the value counted by the access number counter 104. However, the voice provider 102 may provides voice data including the contents of the voice to be output which are changed instead of the level of the voice or in addition to the level of the voice. In the voice data to be provided by the voice provider 102, a voice representation can variously be changed in terms of its level or intonation, or the like.

Furthermore, not only the voice provider 102 provides the contents having the modified voice data, but also the content provider 101 may provide contents having other changed or modified data, in accordance with the value counted by the access number counter 104. Those information which can be changed and provided by the content provider 101 include, for example, data contents (text data and/or image data), color or brightness of an image, any background image, any icon included in the contents, arrangement of a plurality of parts if the contents are composed of the plurality of parts, etc.

In the above-described first to fifth embodiments, the server device 1 (1', 1") only provides the terminal devices 21 to 2n with voice data or the like in accordance with the value currently counted by the access number counter 104 (or the counters 104a, 104b). As illustrated in FIG. 13, the server device 1 (1', 1") may provide the terminal devices 21 to 2n with a graph showing in time series the values counted by the access number counter 104 together with the voice data, etc. If this graph is displayed on the display section 202, the users of the terminal devices 21 to 2n can visually recognize how the inputs from the terminal devices 21 to 2n change in time series. According to this structure, any user of the terminal devices 21 to 2n who has newly logged in to the contents can recognize the transitional change in the inputs performed before he/she had logged in.

In the above-described fifth embodiment, the access number counter 104 counts up the counters 104a and 104b in accordance with the information registered in the user's attribute register 105. For example, the terminal devices 21 to 2n can access pages which differ in contents between supporting teams, and the access number counter 104 may count a counter which is arranged in each page. In this case, the voice provider 103 may refer to a value of a counter in a page to which any of the terminal devices 21 to 2n has logged in and has not logged out, together with a value of a counter in any other pages, so as to generate voice data in accordance with the referred values.

In the first to fifth embodiments, the browser software runs on each of the terminal devices 21 to 2n, and the displaying of the contents and the outputting of the voice data are performed under the control of the browser software. Such use of the browser software are described only by way of example. In the structure where dedicated software is installed in the memory 2B of each of the terminal devices 21 to 2n, the contents may be displayed on this dedicated software and the voice data may be output under the control of the dedicated software.

In the above-described first to fifth embodiments, the system, wherein the server device 1 and the terminal device 21 to 2n are connected with each other through the Internet 3, has been explained by way of example. However, the present invention may be adapted to a system, wherein a server device and terminal devices are connected to a closed commercial network. The present invention may be adapted also to a system, wherein cellular phones as terminal devices receive various information to be transmitted through a base station.

This application is based on Japanese Patent Application No. Heisei 11-267248 (filed on Sep. 21, 1999) and Japanese Patent Application No. Heisei 2000-235087 (filed on Aug. 3, 2000). The disclosures of the above Japanese Patent Applications, including specifications and drawings are incorporated herein by reference in its entirety.

What is claimed is:

1. A chat network system providing chat services to a plurality of participants at their respective terminal devices, the chat network system including a server device and terminal devices connected to the sever device via a network, wherein:

said server device comprises:

input information receiving means for receiving predetermined input information sent from the terminal devices via the network;

count means for counting in accordance with the predetermined input information that said input information receiving means receives;

information providing means for providing information in accordance with a value counted by said count means, wherein the value representing the number of terminal devices which have logged in to a current chat session associated with the predetermined input information;

voice information providing means for providing voice information set at an audible level in accordance with the value that the counting means counts; and sending means for sending information that the information providing means provides, and the voice information that the voice information providing means provides, via said network to the terminal devices currently logged in the chat session; wherein said terminal devices comprise:

input means for inputting said predetermined input information;

input information sending means for sending said predetermined input information input by said input means via the network, and controlling the input information receiving means of said server device to receive the predetermined input information;

means for receiving information sent from the sending means of the server device via the network and voice information; and output means for outputting information and voice information that the receiving means receives.

2. The network system as recited in claim 1, wherein said counting means includes any of (1) means for counting a number of items of the predetermined input information that the input information receiving means receives, (2) means for counting a number of log-in people to the chat network system at that time, in accordance with the predetermined input information that the input information receiving means receives, or (3) means for counting up when said predetermined input information is an input information indicating log-in to the server device, and counting down when said input information indicates log-out.

3. A chat network system providing chat services to a plurality of participants at their respective terminal devices, the chat network system including a server device, and terminal devices connected to the sever device via a network, wherein said terminal devices connected to said server device are divided into groups, and said server device comprises:

input information receiving means for receiving predetermined input information sent from the terminal devices via the network;

counting means for counting for every group in accordance with the predetermined input information that said input information receiving means receives;

information providing means for providing information including voice information set at an audible level in accordance with a counted result for every group as counted by said counting means, wherein the counted result representing the number of terminal devices which have logged in to a current chat session associated with the predetermined input information;

sending means for sending information that the information providing means provides, to the terminal devices currently logged in the chat session, via said network; wherein said terminal devices comprise:

input means for inputting said predetermined input information;

input information sending means for sending the predetermined input information input by said input means via the network, and controlling the input information receiving means of said server device to receive the predetermined input information;

means for receiving information sent from the sending means of the server device via the network, and voice information; and output means for outputting information and voice information that the receiving means receives.

4. The network system as recited in claim 3, wherein said counting means includes any of (1) means for counting a number of items of the predetermined input information that the input information receiving means receives for every group, (2) means for counting for every group, number of log-in people to the chat network system at that time, in accordance with the predetermined input information that the input information receiving means receives, or (3) means for counting up for every group, when said predetermined input information received by the input information receiving means is an input information indicating log-in to the server device, and counting down for every group, when said input information indicates log-out.

5. A chat network system including a server device and terminal devices connected to said server device through a network, wherein:

said server device includes a memory for storing a program, a processor for executing the program, and a first communications device for sending and receiving information to and from said terminal devices, the first communications device receiving predetermined input information sent from said terminal devices through the network, the processor counting in accordance with the predetermined input information received by the first communications device, the processor generating information and voice information set an audible level corresponding to a counted value, wherein the counted value representing the number of terminal devices which have logged in to a current chat session associated with the predetermined input information; and said server device sending the generated information and the voice information to said terminal devices from the first communications device through the network;

each of said terminal devices includes a memory for storing a program, a processor for executing the program, an input device for inputting information, an output device for outputting information, and a second communications device for sending and receiving information to and from said server devices, inputs the predetermined input information through the input device, sends the predetermined input information input from the input device to the first communications device from the second communications device through the network, the second communications device receiving the information and the voice information from the first communications device of said server device through the network, and each of said terminal devices outputting the information and the voice information received by the second communications device from the output device.

6. The network system as recited in claim 5, wherein the processor includes any of (1) means for counting a number of items of the predetermined input information that the first communications device receives, (2) means for counting for every group, a number of log-in people to a chat network system at that time, in accordance with the predetermined input information that the first communications device receives, or (3) means for counting up for every group, when said predetermined input information received by the first communications device is an input information indicating log-in to the server device, and counting down for every group, when said input information indicates log-out.

7. An information server system which serves participants of a chat network service with information through a network, comprising:

accepting means for accepting predetermined information sent from the participants of the chat network service through the network;

count means for counting in accordance with the predetermined information which said accepting means has accepted;

information providing means for providing said information including voice information set at an audible level corresponding to a value counted by said count means to the participants of the chat network service through the network, wherein the value representing the number of participants who have logged in to a current chat session associated with the predetermined input information; and sending means for sending said information via said network to the participants currently logged in the chat session.

8. The information providing system as recited in claim 7, wherein said counting means includes any of (1) means for counting a number of items of the Predetermined input information that the input information receiving means receives, (2) means for counting a number of log-in people to a chat network system at that time, in accordance with the predetermined input information that the input information receiving means receives, or (3) means for counting up when said predetermined input information received by the input information receiving means is an input information indicating log-in to the server device, and counting down when said input information indicates log-out.

9. A method for serving information, in a chat network system including a server device and terminal devices connected to each other through a network, from said server device to said terminal devices, said method comprising:

an inputting step of inputting predetermined input information from said terminal devices;

an input information sending step of sending the predetermined input information input in said inputting step from said terminal devices to said server device through the network;

a counting step of counting according to the predetermined input information which is sent in said input information sending step and received by said server device;

an information providing step, as performed by said server device, providing information corresponding to a value counted in said counting step, wherein the value representing the number of terminal devices which have logged in to a current chat session associated with the predetermined input information;

a voice information providing step of the server device providing voice information set at an audible level in accordance with the value counted in the counting step;

a sending step of sending the information provided in said information providing step and the voice information provided in said voice information providing step, to said terminal devices currently logged in the chat session from said server device through the network; and an outputting step of outputting from said terminal devices the information and voice information sent in said sending step and received by said terminal device.

10. A method for providing information to participants of a chat network service through a network, said method including counting in accordance with predetermined input information sent from the participants of the chat network service:

providing the participants of the chat network service through the network with said information including voice information set at an audible level corresponding to a value counted in accordance with the predetermined input information sent from the participants of the network service through the network, wherein the value representing the number of participants which have logged in to a current chat session associated with the predetermined information; and sending said information via said network to the participants currently logged in the chat session.

11. A server device which is connected to terminal devices through a network for providing chat services to a plurality of participants at their respective terminal devices, comprising:

input information receiving means for receiving predetermined input information sent from the terminal devices through said network;

counting means for counting in accordance with the predetermined input through the network.

12. The server device of claim 11, wherein said voice providing means provide voice information having a modified voice representation which is output in accordance with the value counted by said counting means.

13. The server device as recited in claim 11, wherein:

said counting means includes any of (1) means for counting for every group a number of items of the predetermined input information that the input information receiving means receives, (2) means for counting a number of log-in people to a chat network system at that time for every group, in accordance with the predetermined input information that the input information receiving means receives, or (3) means for counting up for every group, when said predetermined input information is an input information indicating log-in to the server device, and counting down for every group, when said input information indicates log-out.

14. The server device as recited in claim 11, wherein:

the predetermined input information is information and voice information, which is input from said terminal devices, as regards contents of the information provided by said information providing means; and said counting means counts in accordance with the predetermined input information which is received by said input information receiving means at a predetermined interval.

15. The server device as recited in claim 14, wherein:

the predetermined input information includes various types of the contents of the information and voice information provided by said information providing means; and said counting means is means for counting for every type of the contents of the predetermined input information.

16. A server device connected to terminal device through a network for providing chat services to a plurality of participants at their respective terminal devices, wherein:

said terminal devices connected to said server device through the network are divided into groups;

and wherein the server device comprises:

input information receiving means for receiving predetermined input information sent from the terminal devices through the network;

counting means for counting for every group of terminal devices, in accordance with the predetermined input information received by input information receiving means;

information providing means for providing said terminal devices with information, including voice information set at an audible level, which differ from each group of said terminal devices, in accordance with a counted result for every group as counted by said counting means, wherein the counted result representing the number of terminal devices which have logged in to a current chat session associated with the predetermined input information; and sending means for sending said information via said network to the participants currently logged in the chat session.

17. The server device as recited in claim 16, further comprising user information registration means for registering information regarding users of said terminal devices which are connected to said server device through the network, and wherein said terminal devices connected to said server device through the network are divided into groups in accordance with the information registered by said user information registration means, and said counting means refers to the user information registration means based on the predetermined input information received by said input information receiving means, and counts for each group of said terminal devices.

18. The server device as recited in claim 16, wherein said counting means includes any of (1) means for counting for every group, a number of items of the predetermined input information that the input information receiving means receives, (2) means for counting a number of log-in people to a chat network system at that time for every group in accordance with the predetermined input information that the input information receiving means receives, or (3) means for counting up for every group, when said predetermined input information is an input information indicating log-in to the server device, and counting down for every group, when said input information indicates log-out.

19. A server device which can communicate with terminal devices through a network for providing chat services to a plurality of participants at their respective terminal devices, including a memory for storing a program, a processor for executing the program, and a communications device for sending and receiving information to and from said terminal devices, wherein:
said communications device receiving predetermined input information sent from the terminal devices through the network;
said processor counting in accordance with the predetermined input information received by the communications device;
said processor generating information including voice information set at an audible level corresponding to a value counted by said processor; and sending the generated information from the communications device to the terminal devices through the network, wherein the value representing the number of terminal devices which have logged in to a current chat session associated with the predetermined input information.

20. The server device as recited in claim 19, wherein:
the predetermined input information is an input information which is input, in said terminal devices, as regards contents of the information generated by the processor and sent from the communications device; and
the processor counts in accordance with the input information received by the communications device at a predetermined interval.

21. A computer readable recording medium which records a program making a computer device, which is connected to terminal devices through a network for providing chat services to a plurality of participants at their respective terminal devices, function as:
input information receiving means for receiving predetermined input information sent from said terminal devices through the network;
counting means for counting in accordance with the predetermined input information received by said input information receiving means;
information providing means for providing information in accordance with a value counted by said counting means, wherein the value representing the number of terminal devices which have logged in to a current chat session associated with the predetermined input information;
voice information providing means for providing voice information set an audible level in accordance with a value counted by said counting means; and
sending means for sending the information provided by said information providing means and the voice information providing means to said terminal devices currently logged in the chat session through the network.

22. A computer data signal embodied in a carrier wave and sent through a communications path, said signal making a computer device which is connected to a plurality of terminal devices through a network for providing chat services to a plurality of participants at their respective terminal devices to function as a computer device connected to terminal devices through a network as:
input information receiving means for receiving predetermined input information sent from said terminal devices through said network;
counting means for counting in accordance with the predetermined input information received by said input information receiving means;
information providing means for providing information in accordance with a value counted by said counting means, wherein the value representing the number of terminal devices which have logged in to a current chat session associated with the input information; and
voice information providing means for providing voice information set at an audible level in accordance with a value counted by said counting means; and
sending means for sending the information provided by said information providing means and the voice information providing means to the terminal devices currently logged in the chat session through the network.

23. A server device which can communicate with terminal devices through a network for providing chat services to a plurality of participants at their respective terminal devices, the server device including a memory for storing a program, a processor for executing the program, and a communications device for sending and receiving information to and from said terminal devices,
the communications device receiving predetermined input information sent from said terminal devices that are divided into groups beforehand, through the network,
the processor counting for every group, in accordance with the predetermined input information received by the communications device,
the processor generating for every group, information including voice information set at an audible level, corresponding to a value counted by said processor, wherein the value representing the number of terminal devices which have logged in to a current chat session associated with the input information, and
said server device sending the generated information to said terminal devices from the communications device through the network.

24. The server device as recited in claim 23, wherein said processor includes any of (1) means for counting a number of items of the predetermined input information that the communications device receives, (2) means for counting for every group, a number of log-in people to a chat network system at that time, in accordance with the predetermined input information that the communications device receives, or (3) means for counting up for every group, when said predetermined input information received by the communications device is an input information indicating log-in to the server device, and counting down for every group, when said input information indicates log-out.

25. A computer readable recording medium which records a program wherein the program makes a computer device which is communicatable with terminal devices the network for providing chat services to a plurality of participants at their respective terminal devices to function as:

input information receiving means for receiving predetermined input information sent from said terminal devices, which are divided into groups beforehand, through the network;

counting means for counting for every group, in accordance with the predetermined input information received by said input information receiving means;

information providing means for providing information including voice information set at an audible level in accordance with a value counted by said counting means, wherein the value representing the number of terminal devices which have logged in to a current chat session associated with the input information; and sending means for sending the information provided by said information providing means to said terminal devices currently logged in the chat session through the network.

26. A computer data signal embodied in a carrier wave and sent through a communications path, said signal making a computer which is connected to a plurality of terminal devices through a network for providing chat services to a plurality of participants at their respective terminal devices to function as:

input information receiving means for receiving predetermined input information sent from said terminal devices which are divided into groups beforehand, through the network;

counting means for counting for every group, in accordance with the predetermined input information received by said input information receiving means;

information providing means for providing information including voice information set at an audible level in accordance with a value counted by said counting means, wherein the value representing the number of terminal devices which have logged in to a current chat session associated with the input information; and sending means for sending the information provided by said information providing means to said terminal devices currently logged in the chat session through the network.

27. An information server system which serves participants of a chat network service with information through a network, comprising:

accepting means for accepting predetermined information sent from the participants in a plurality of groups, of the chat network service through the network;

counting means for counting for every group, in accordance with the predetermined information said accepting means has accepted; and information providing means for providing information including voice information set at an audible level for every group, corresponding to a value counted by said counting means for every group, to the participants of the chat network service through the network, wherein the value representing the number of participants who have logged in to a current chat session associated with the predetermined information; and sending means for sending said information via said network to the participants currently logged in the chat session for each group.

28. A method for providing information to participants of a chat network service through a network, said method including counting in accordance with predetermined input information sent from the participants of the chat network service through the network;

providing the participants of the chat network service, who are divided into groups, through the network with information including voice information set at an audible level corresponding to a value counted for every group, in accordance with predetermined input information sent from the participants of the chat network service through the network, wherein the value representing the number of participants who have logged in to a current chat session associated with the predetermined input information, and sending the provided information to the participants currently logged in the chat session.

* * * * *